Dec. 25, 1956     H. W. KLEIST     2,775,683
HEAT EXCHANGERS FOR VAPORIZING LIQUID REFRIGERANT
Filed July 16, 1954     2 Sheets-Sheet 1
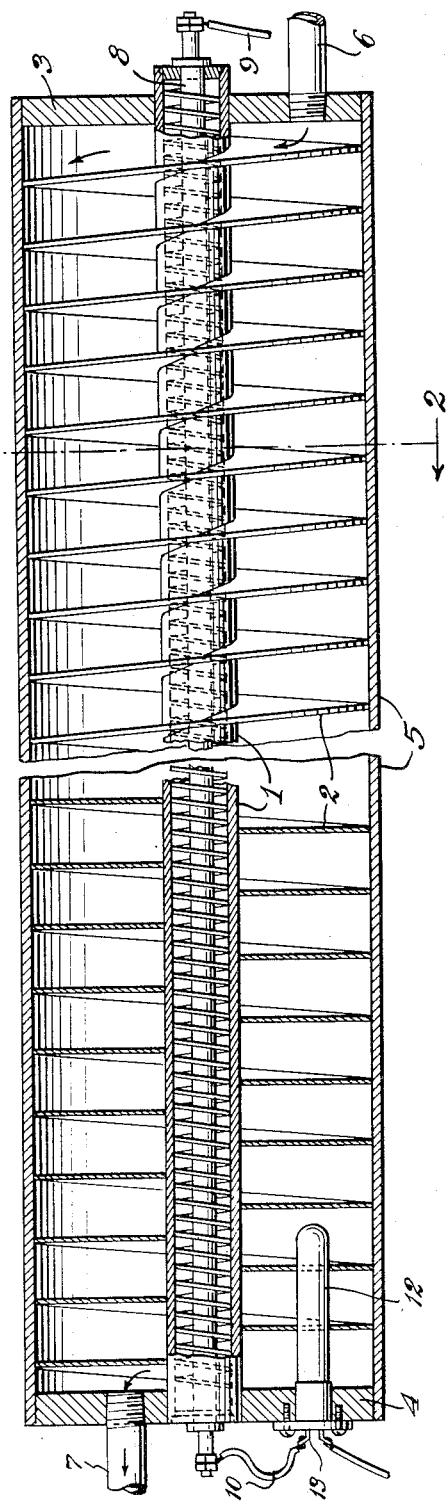
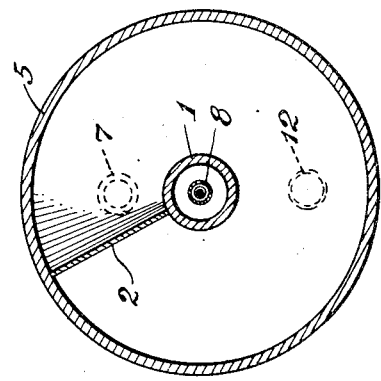
Inventor
Herman W. Kleist
by Parker & Carter
Attorneys Dec. 25, 1956 H. W. KLEIST 2,775,683
HEAT EXCHANGERS FOR VAPORIZING LIQUID REFRIGERANT
Filed July 16, 1954 2 Sheets-Sheet 2
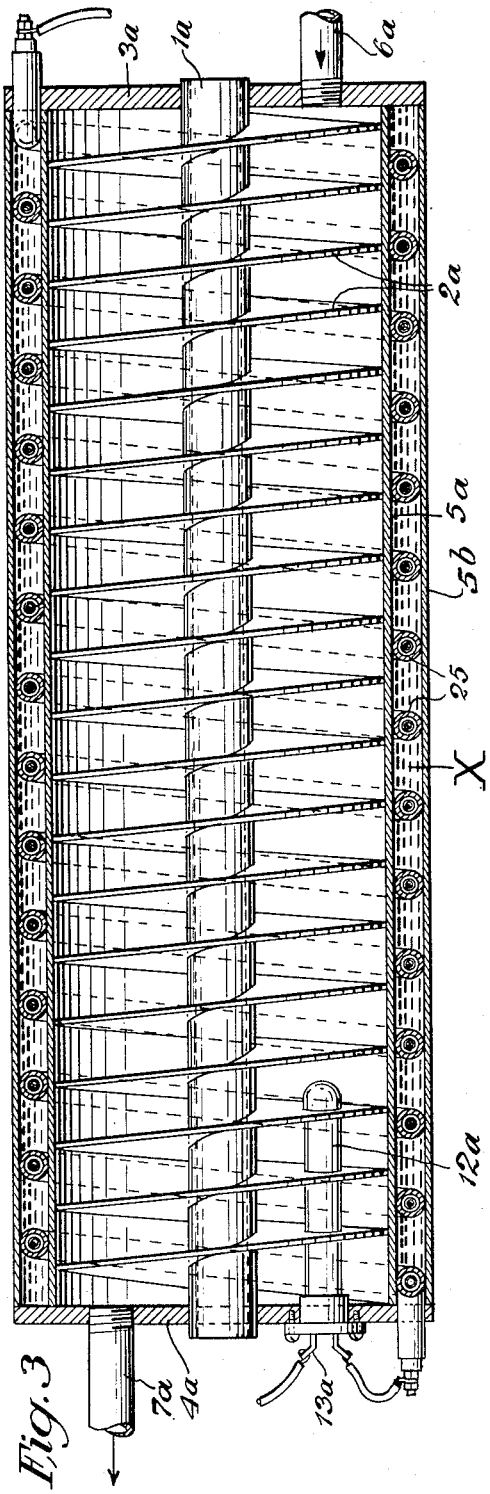
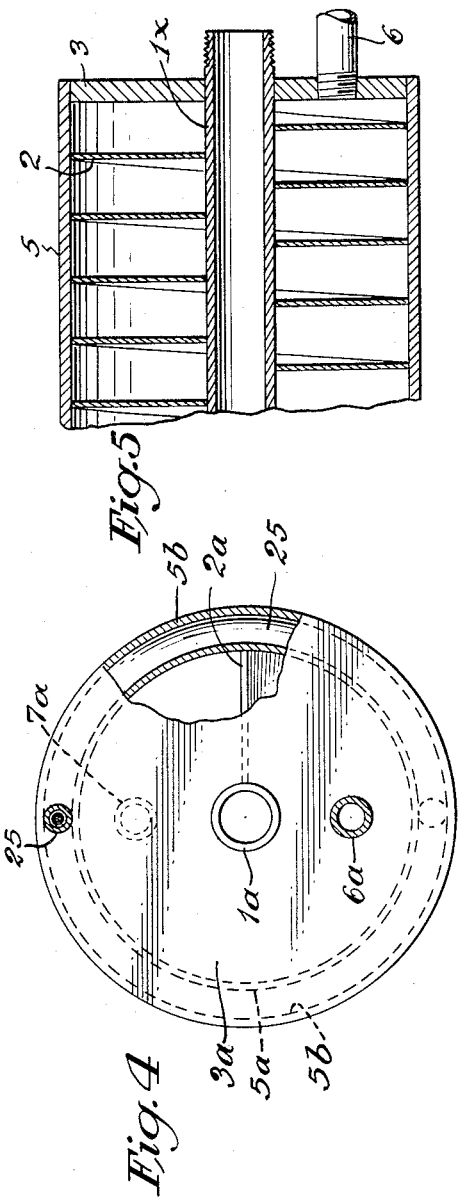
Inventor
Herman W. Kleist
by Parker & Carter
Attorneys

United States Patent Office 2,775,683
Patented Dec. 25, 1956

2,775,683

HEAT EXCHANGERS FOR VAPORIZING LIQUID REFRIGERANT

Herman W. Kleist, Hollywood, Ill., assignor to Dole Refrigerating Company, Chicago, Ill., a corporation of Illinois Application July 16, 1954, Serial No. 443,759

4 Claims. (Cl. 219—39)

My invention relates to an improvement in heat exchangers, and has for one purpose to provide a heat exchanger adapted for vaporizing a liquid refrigerant.

Another purpose is to provide a heat exchanger of simple structure and efficient operation, which is relatively cheap and easy to manufacture.

Another purpose is to provide an improved heat exchanger for vaporizing volatile liquids.

Other purposes will appear from time to time in the course of the specification and claims.

I illustrate my invention more or less diagrammatically in the accompanying drawings wherein:

Figure 1 is a longitudinal, axial section through one form of my heat exchanger;

Figure 2 is a section on the line 2—2 of Figure 1;

Figure 3 is an axial, longitudinal section through another form of my vaporizer;

Figure 4 is an end elevation, with parts broken away and parts in section; and

Figure 5 is a partial axial section illustrating still another embodiment of my invention.

Like parts are indicated by like symbols throughout the specification and drawings.

Referring, first, to the form of Figures 1 and 2, 1 generally indicates a tubular central core which is shown as cylindrical. Coiled about it is a spiral fin or vane 2. 3, 4 indicate heads or end closures, through which the core is shown as passing. 5 is a surrounding jacket, herein shown as cylindrical. 6 is an inlet passage or pipe in the head or end 3, and 7 is an outlet passage or pipe in the head or end 4. I illustrate within the core or tube 1 any suitable heating means, shown as a resistance element, at 8, with conductive connections 9 and 10, which may be connected to any suitable source of electric power. The parts are so proportioned and fitted that the vane 2 defines a spiral passage in communication, at one end, with the inlet pipe 6, and in communication, at the opposite end, with the outlet pipe 7. The parts are preferably so fitted as to provide a substantially or reasonably tight passage. It will be understood that when a volatile in liquid or partly liquid form is delivered to the spiral passage through the inlet 6 it can escape, after passing through the spiral passage, by the outlet 7. In the course of its travel through the spiral passage the volatile fluid is subjected to the heat of the heating element 8, shown as extending longitudinally along the heat exchanger.

One application of my heat exchanger is the vaporization of liquid, or partly liquid, volatile refrigerants, on their way to the suction side of a compressor. If a volatile refrigerant in liquid, or partly liquid, form flows into the coil passage defined by the parts shown in Figure 1, it is vaporized by the heat source extending longitudinally along the passage and escapes as a gas through the outlet pipe 7. The parts are so proportioned, and the heat source is preferably so controlled, that, in the course of the travel of the liquid or the mixed liquid and gas through my heat exchanger, the liquid portion is completely vaporized, and only the gas reaches the suction side of the compressor. Since the details of the compressor, as such, form no part of my invention, no compressor is illustrated. It will be understood, however, that my heat exchanger may be connected between any suitable evaporator and the suction side of any suitable compressor, in refrigerating systems wherein a volatile refrigerant is compressed, condensed, evaporated, and recompressed.

I may find it advantageous to employ a thermostatic control, generally indicated as 12. It may include a tube extending through one end of the heat exchanger, in which tube or pipe any suitable heat responsive element may be positioned. This heat responsive element, in turn, operates any suitable switch 13, whereby, when a predetermined temperature is reached within the heat exchanger, the circuit to the resistance element 8 is broken.

With reference to the form of Figures 3 and 4, the structure is substantially the same, except for the location of the heating means. The central core 1a is surrounded by the spiral fin 2a. Ends or heads 3a, 4a are provided with an inlet pipe 6a and an outlet pipe 7a, respectively. In place of the single jacket 5 of Figure 1, I illustrate a double jacket structure 5a, 5b, within which there is any suitable heating element. I illustrate, for example, a tube or pipe 25 which may constitute a spacer between the two jacket elements, and which may carry an electric resistance or any other suitable heating means. As in Figure 1, I may, under some circumstances, wish to employ a heat responsive assembly, including the pipe 12, 12a controlling a switch 13a in circuit with the resistance of the tubular structure 25.

In Figure 5, I illustrate a structure identical with Figure 1, except for the omission of the resistance and the provision of a tubular core 1x adapted to be connected with any suitable piping system for delivering a heated fluid through the core.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I illustrate, basically, a heat exchanger which includes a tortuous or spiral passage through which a volatile fluid flows. My heat exchanger is adapted, for example, to ensure the complete vaporization of a refrigerant which may start toward the suction side of a compressor in liquid or partly liquid form. In the form of Figures 1 and 2, the vaporization is shown as accomplished by a resistance element or assembly located within and surrounded by the spiral passage.

In the form of Figures 3 and 4, I surround the exterior of the spiral passage by a suitable heating jacket, therein shown as a resistance assembly within a double jacket. If desired, I may position, within the double jacket, and about the tube 25 of the resistance assembly, a suitably eutectic or heat storage liquid or body, indicated at X in Figure 3. In both forms, I may employ any suitable control for terminating the heating circuit when a predetermined temperature is present within the heat exchanger, or I may operate the heating circuit continuously, or substantially continuously. It will also be understood that, if I wish, I may employ a suitable heat storage body within the core 1 in Figure 1.

In Figure 5, I illustrate a variant form of my heat exchanger, in which a heating fluid is supplied through the core 1.

It will be understood, also, that, in Figure 3, it is within the scope of my invention to substitute, for the resistance, any suitable tubular or jacket means for passing a heating fluid about the exterior of the spiral passage.

While I do not wish to limit my invention to any particular application, it may advantageously be used in connection with refrigerating systems where an evaporator is defrosted by bypassing the condenser and by directing a hot gas from the pressure side of the compressor to the evaporator. Such use of the hot gas prevailingly results in a partial liquefaction of the volatile refrigerant. The interposition of my heat exchanger in the return path of the liquid, or partly liquid, refrigerant prevents the delivery of liquid refrigerant to the suction or low pressure side of the compressor. This is one practical use of my invention, but is given as a matter of example rather than of limitation.

I claim:

1. In a heat exchanger adapted for vaporizing a volatile refrigerant, a central, generally cylindrical core, a helical vane extending about said core, of a pitch substantially less than the diameter of the helix, a jacket engaging the outer edges of said vane and forming with said vane and core a helical passage extending substantially from end to end of the core, an inlet duct extending to one end of said passage and an outlet duct extending from the opposite end of the passage, a resistance heater in said core extending generally from end to end of the passage, and a heat responsive element conductively connected to said resistance heater and positioned and adapted to make and break an electric circuit for said heater in response to predetermined changes in temperature of fluid flowing through said passage.

2. The structure of claim 1, characterized in that the heat responsive element is located adjacent the outlet end of the passage.

3. In a heat exchanger adapted for vaporizing a volatile refrigerant, a central, generally cylindrical core of substantially uniform cross-section from end to end, a helical vane extending about said core, of a pitch substantially less than the diameter of the helix, and of a radial width substantially exceeding the radius of the core, a generally cylindrical jacket engaging the outer edges of said vane and forming, with said vane and core, a helical passage of substantially uniform cross-section extending substantially from end to end of the core, an end member closing each end of said jacket, an inlet duct in one said end member and an outlet duct in the other, a resistance heater extending generally from end to end of the heat exchanger, and a heat responsive element connected to said resistance heater and positioned and adapted to make and break an electric circuit for said heater in response to predetermined changes in the temperature of fluid flowing through said passage, said heat responsive element being located in said passage and being in position to be contacted by the fluid flowing therethrough.

4. The structure of claim 3, characterized in that the resistance heater is positioned within and extends substantially from end to end of the core.

References Cited in the file of this patent

UNITED STATES PATENTS

| | | |
|---|---|---|
| 1,494,326 | Adams | May 20, 1924 |
| 1,531,777 | Frost | Mar. 31, 1925 |
| 1,639,051 | Munday | Aug. 16, 1927 |
| 1,671,677 | Keeton | May 29, 1928 |
| 1,766,802 | Sanders | June 24, 1930 |
| 2,252,541 | Arnold | Aug. 12, 1941 |